(12) United States Patent
Avidan

(10) Patent No.: US 7,440,586 B2
(45) Date of Patent: Oct. 21, 2008

(54) OBJECT CLASSIFICATION USING IMAGE SEGMENTATION

(75) Inventor: Shmuel Avidan, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 658 days.

(21) Appl. No.: 10/898,379

(22) Filed: Jul. 23, 2004

(65) Prior Publication Data

US 2006/0018521 A1    Jan. 26, 2006

(51) Int. Cl.
    *G06K 9/00* (2006.01)
(52) U.S. Cl. .................................. 382/103; 382/118
(58) Field of Classification Search ................ 382/103, 382/118
    See application file for complete search history.

(56) References Cited

U.S. PATENT DOCUMENTS

| | | | | |
|---|---|---|---|---|
| 5,657,397 | A * | 8/1997 | Bokser | 382/225 |
| 6,081,766 | A * | 6/2000 | Chapman et al. | 702/27 |
| 6,788,827 | B1 * | 9/2004 | Makram-Ebeid | 382/276 |
| 7,136,844 | B2 * | 11/2006 | Wrobel et al. | 707/1 |
| 2001/0026631 | A1 * | 10/2001 | Slocum et al. | 382/115 |
| 2003/0026485 | A1 * | 2/2003 | Gotsman et al. | 382/224 |
| 2004/0095374 | A1 * | 5/2004 | Jojic et al. | 345/716 |
| 2004/0145592 | A1 * | 7/2004 | Twersky | 345/619 |
| 2004/0213439 | A1 * | 10/2004 | Blake et al. | 382/118 |

OTHER PUBLICATIONS

L. Sirovich and M. Kirby. Low-dimensional procedure for the characterisation of human face. In journal of the optical society of America 4, p. 510-524.*

Athanasios Papoulis and S. Unnikrishna Pillai. Probability, Random Variables and Stochastic Processes. Fourth Edition, 2002.*

B. Heisele, T. Serre, S. Mukherjee, and T. poggio. Feature reduction and hierarchy of classifiers for fast object detection in video images. In Proc. CVPR, vol. 2, pp. 1824, 2001.*

NIST/SEMATECH, "Engineering statistics, E-Handbook of statistical methods, 2003, paragraph [6.5.4.1]".*

Modelon et al. "Clinical Laboratory Science program, University of Louisville, Jun. 1999".*

Shai Avidan. EigenSegments: A spatio-temporal decomposition of an ensemble of image. In European Conference on Computer Vision (ECCV), May 2002, Copenhagen, Denmark.

(Continued)

*Primary Examiner*—Jingge Wu
*Assistant Examiner*—Amara Abdi
(74) *Attorney, Agent, or Firm*—Dirk Brinkman; Clifton D. Mueller; Gene V. Vinokur

(57) ABSTRACT

A method represents a class of objects by first acquiring a set of positive training images of the class of objects. A matrix A is constructed from the set of positive training images. Each row in the matrix A corresponds to a vector of intensities of pixels of one positive training image. Correlated intensities are grouped into a set of segments of a feature mask image. Each segment includes a set of pixels with correlated intensities. From each segment, a subset of representative pixels is selected. A set of features is assigned to each pixel in each subset of representative pixels of each segment of the feature mask image to represent the class of objects.

15 Claims, 7 Drawing Sheets

OTHER PUBLICATIONS

Yoav Freund and Robert E. Schapire. A decision-theoretic generalization of on-line learning and an application to boosting. In Computational Learning Theory: Eurocolt 95, pp. 2337. Springer-Verlag, 1995.

M. Elad, Y. Hel-Or and R. Keshet. Rejection based classifier for face detection. Pattern Recognition Letters 23 (2002) 1459-1471.

D. Keren, M. Osadchy, and C. Gotsman. Antifaces: A novel, fast method for image detection. IEEE Trans. on Pattern Analysis and Machine Intelligence, 23 (7) :747761, 2001.

S.Z. Li, L. Zhu, Z.Q. Zhang, A. Blake, H.J. Zhang and H. Shum. Statistical Learning of Multi-View Face Detection. In *Proceedings of the 7th European Conference on Computer Vision*, Copenhagen, Denmark, May 2002.

Henry Schneiderman and Takeo Kanade. A statistical model for 3d object detection applied to faces and cars. In IEEE Conference on Computer Vision and Pattern Recognition. IEEE, Jun. 2000.

K.-K. Sung and T. Poggio. Example-based Learning for View-Based Human Face Detection. In *IEEE Transactions on Pattern Analysis and Machine Intelligence* 20 (1) :39-51, 1998.

M. Turk and A. Pentland. Eigenfaces for recognition. In *Journal of Cognitive Neuroscience*, vol. 3, No. 1, 1991.

S. Romdhani, P. Torr, B. Schoelkopf, and A. Blake. Computationally efficient face detection. In Proc. Intl. Conf. Computer Vision, pp. 695700, 2001.

H. A. Rowley, S. Baluja, and T. Kanade. Neural network-based face detection. IEEE Trans. on Pattern Analysis and Machine Intelligence, 20 (1) :2338, 1998.

P. Viola and M. Jones. Rapid Object Detection using a Boosted Cascade of Simple Features. In *IEEE Conference on Computer Vision and Pattern Recognition*, Hawaii, 2001.

J. Wu, J. M. Rehg, and M. D. Mullin. Learning a Rare Event Detection Cascade by Direct Feature Selection. To appear in Advances in Neural Information Processing Systems 16 (NIPS*2003), MIT Pr.

* cited by examiner

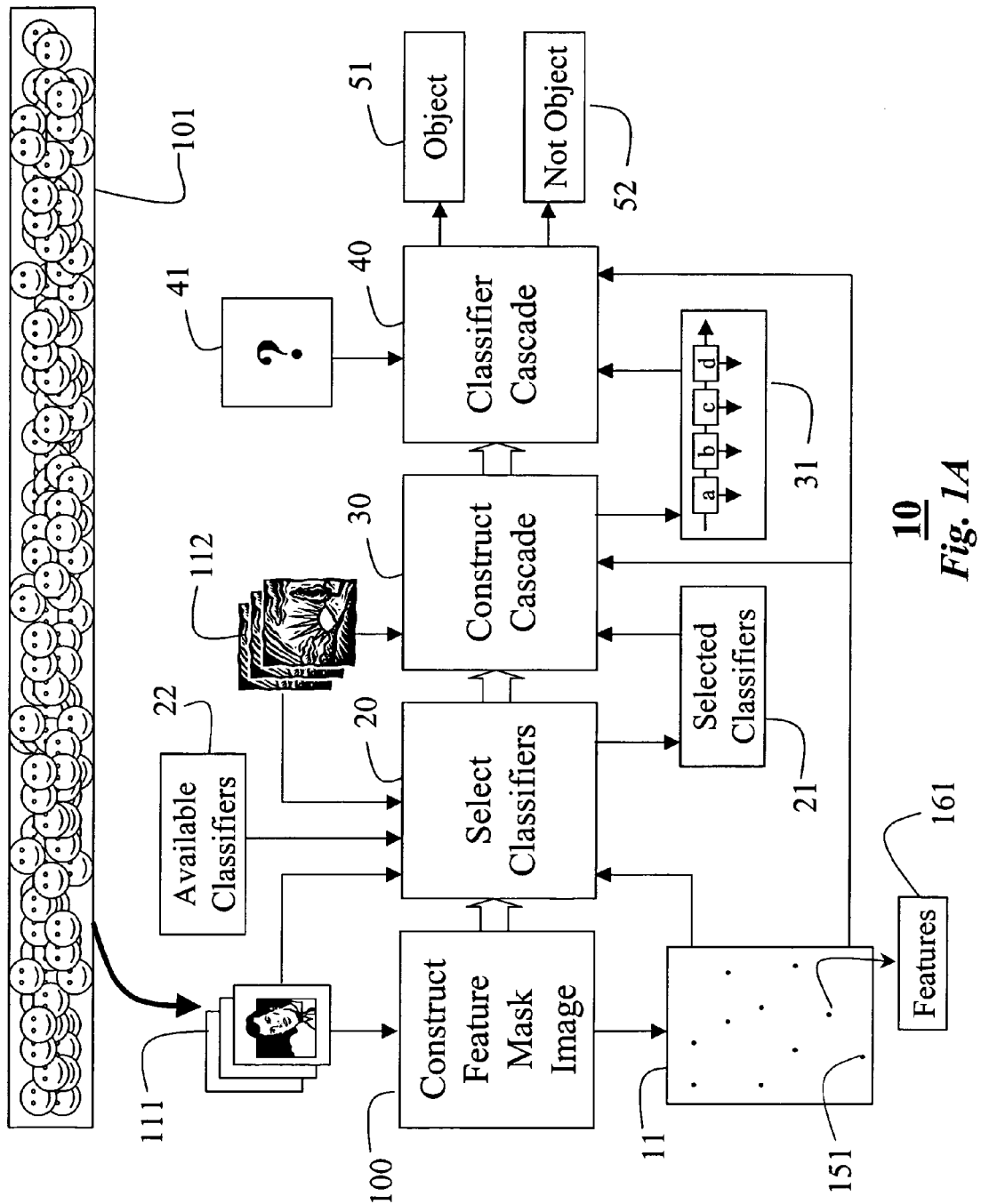

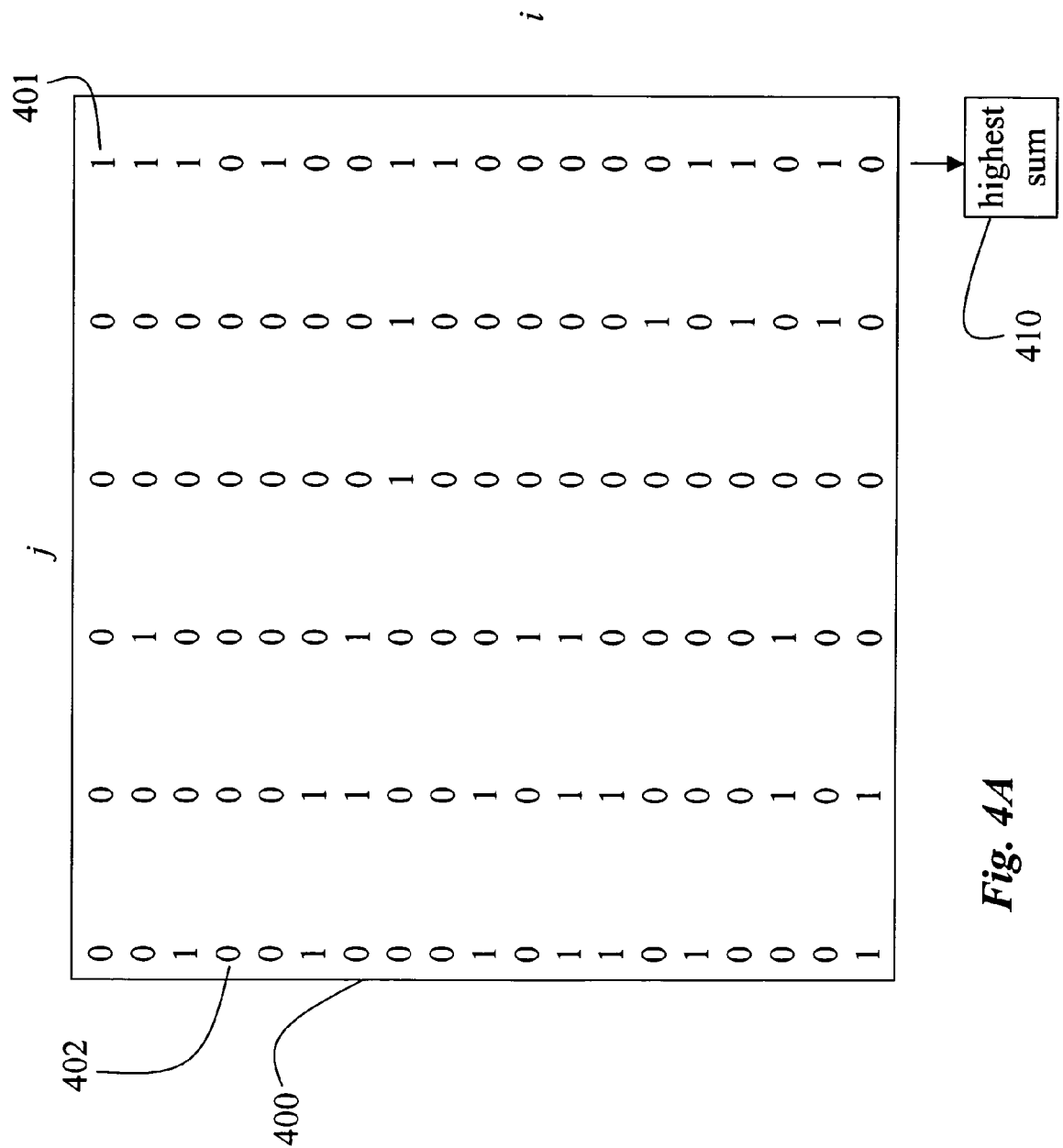

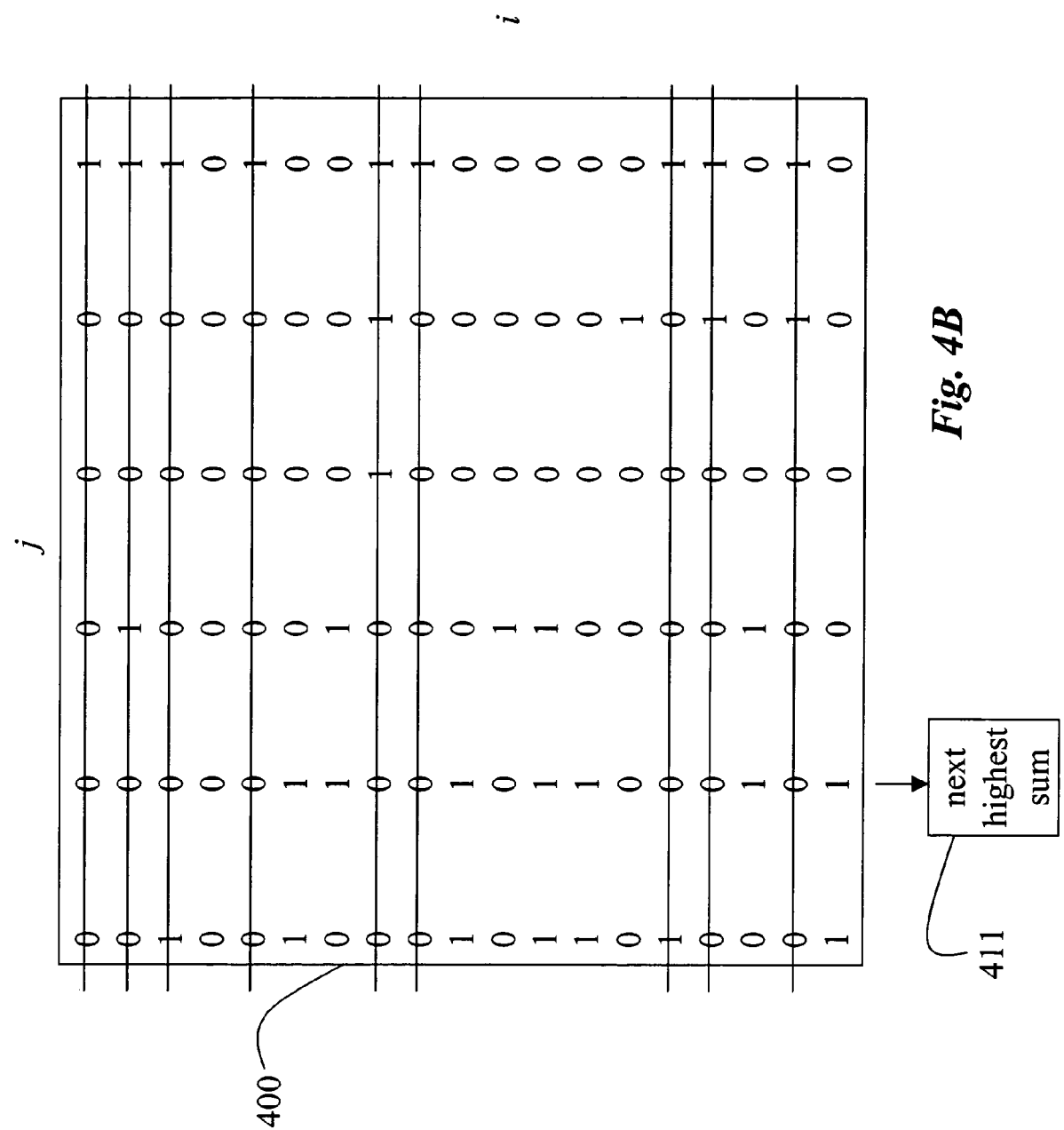

OBJECT CLASSIFICATION USING IMAGE SEGMENTATION

FIELD OF THE INVENTION

This invention is related generally to computer vision, and more particularly to classification.

BACKGROUND OF THE INVENTION

Many prior art object classification systems, particularly face recognition systems, use a cascade of classifiers to detect an object in an image. Instead of applying a single classifier to the image, cascades of increasingly more complex classifiers are applied to the image. Portions of the image that do not include the object are rejected early, while portions that are accepted are eventually marked as including the object. The advantages of such systems are described in U.S. patent application Ser. No. 10/200,464, "System and Method for Detecting Objects in Images," filed by Viola et al. on Jul. 22, 2002, and in Viola et al., "Rapid Object Detection using a Boosted Cascade of Simple Features," IEEE Conference on Computer Vision and Pattern Recognition, 2001.

Similar methods are described by Elad et al., "Rejection based classifier for face detection," Pattern Recognition Letters 23, pp. 1459-1471, 2002, Keren et al., "Antifaces: A novel, fast method for image detection," IEEE Trans. on Pattern Analysis and Machine Intelligence, 23(7), pp. 747-761, 2001, and Romdhani et al., "Computationally efficient face detection," Proc. Intl. Conf. Computer Vision, pp. 695-700, 2001.

All of those methods use simple classifiers to reject large portions of the image, leaving more time to use more complex, and time consuming classifiers for the remaining portions of the image that are more likely to include a face. All of those methods focus on the following issues: the features on which the methods operate, the process used to extract the features from the image, and the process used to select features.

Elad et al. uses features based on pixel values, and selects classifiers that maximize the rejection rate. Keren et al. use an anti-face detector that assumes a normal distribution in the background of the image. Romdhani et al. construct a support vector machine (SVM) and then approximate the SVM with a sequence of support vector classifiers that use non-linear optimization. All of the above methods process each pixel in the image at least once before a portion of the image is rejected.

In contrast, Viola et al. construct a feature space that includes a combination of rectangular regions that can be determined from pixel images using an integral image. They use a sequential feature selection process based on AdaBoost, Freund et al., "A decision-theoretic generalization of on-line learning and an application to boosting," Computational Learning Theory: Eurocolt 95, Springer-Verlag, pp. 2337 at seq., 1995.

An important advantage of the feature space of Viola et al. is that image patches can be rejected with a small number of operations. Although the Viola rectangular filters are efficient to determine using the integral image, they do form a large feature space, thus placing a heavy computational burden on the feature selection process that follows.

Another method replaces the sequential forward searching process of Viola et al. with a floating search process with backtracking capabilities, Li et al., "Statistical Learning of Multi-View Face Detection," Proceedings of the 7th European Conference on Computer Vision, May 2002.

Some classifiers have excellent results but take more time than the 'greedy' classifiers described above, Heisele et al., "Feature reduction and hierarchy of classifiers for fast object detection in video images," Proc. CVPR, Vol. 2, pp. 1824 et seq., 2001, Schneiderman et al., "A statistical model for 3D object detection applied to faces and cars," IEEE Conference on Computer Vision and Pattern Recognition. IEEE, June 2000, Sung et al., "Example-based Learning for View-Based Human Face Detection," IEEE Transactions on Pattern Analysis and Machine Intelligence 20(1), pp. 39-51, 1998, and Rowley et al., "Neural network-based face detection," IEEE Trans. on Pattern Analysis and Machine Intelligence, 20(1), pp. 2338 et seq., 1998.

It is desired to improve the performance of object classifiers.

SUMMARY OF THE INVENTION

In object classification applications, it is desired to determine whether an image includes a particular object or not, for example a face. In the case where a substantial portion of the image to be processed does not include the particular object, it would be advantageous to quickly reject those portions of the images that do not include the object, with absolute certainty.

The invention provides a system and method for classifying those portions of the image that do not contain a particular object. Instead of focusing on an object recognition step, the invention focuses on classifying portions of the image that do not include a particular object, making the invention an excellent pre-processing step to accelerate machine learning classifiers and classifiers such as neural-networks, Bayes classifiers, and support vector machines (SVM).

The invention decomposes a set of training images into segments of similar pixels. The relationships between the mean and variance of the image segments are used to form a cascade of classifiers that can reject almost 99.9% of image portions. Thus, only a small fraction of an image is passed to a full-scale object classifier.

A shape of the image segments is determined from the set of training images. Thus, the segments form a low dimensional feature space in which an exhaustive search for the best features is tractable.

BRIEF DESCRIPTION OF THE DRAWINGS

FIG. 1A is a flow diagram of a method for classifying objects according to the invention;

FIGS. 4A and 4B are binary rejection table according to the invention; and

DETAILED DESCRIPTION OF THE PREFERRED EMBODIMENT

Figure 1B:
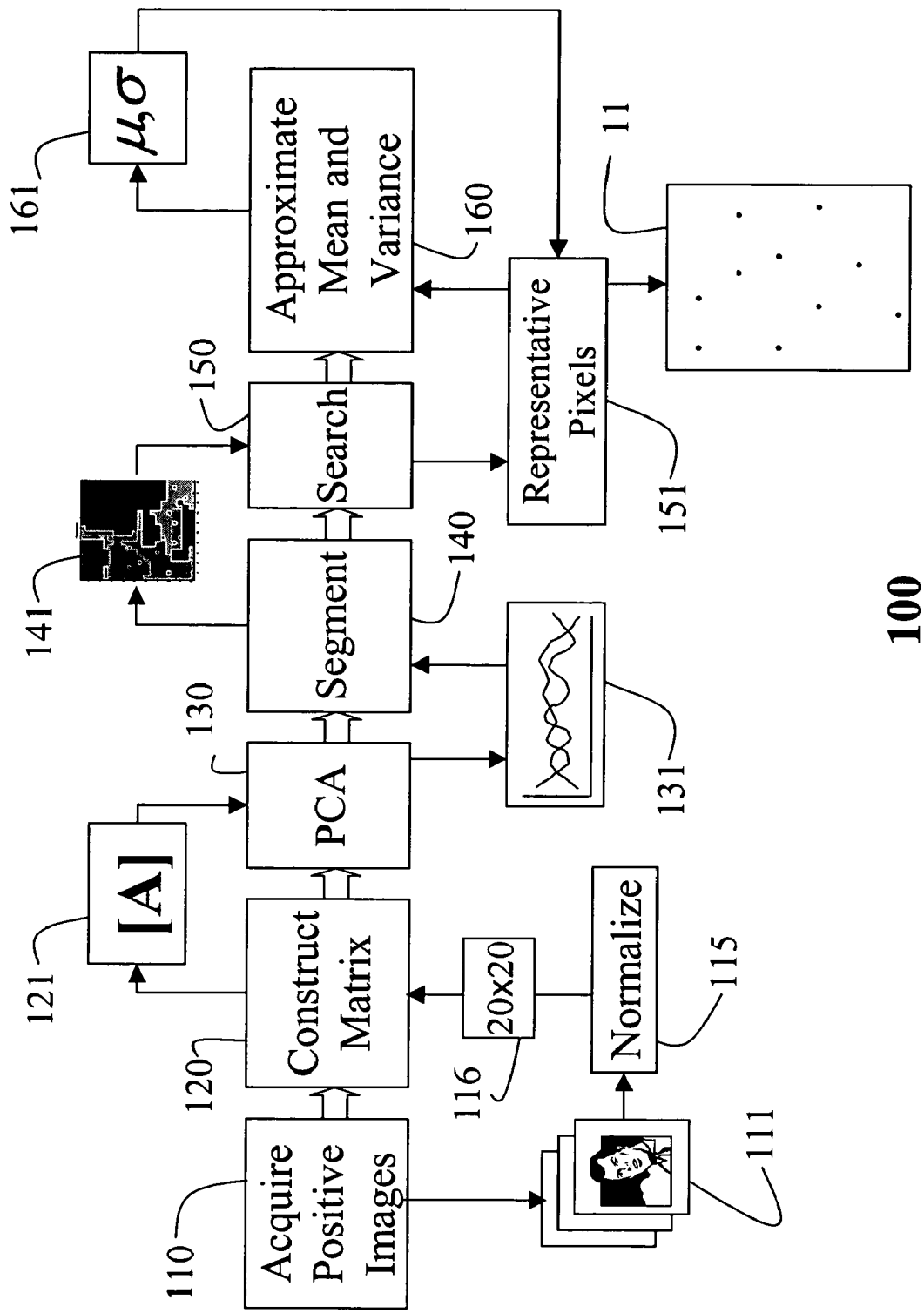
FIG. 1B is a flow diagram of a method for determining a feature mask image according to the invention.

FIG. 1A shows a system and method 10 for classifying an object in an image. The method includes the following phases.

A single feature mask image 11 is constructed 100 from a set of positive training images 111 of a class of objects 101, for example human faces or cars. It is assumed that all images are acquired from approximately the same viewpoint. For example, the images 111 are all frontal views of the faces 101, or rear views, if the objects were cars. As a characteristic, a set of features 161 is associated only with a very small number of representative pixels 151 in the feature mask image 11. For the purpose of object classification, it is the intent that this single feature mask image 11 represents all images that can ever by acquired of the class of objects. For example, the feature mask image can represent the millions and millions of I.D. photographs that exist. This makes the feature mask image 11 an excellent tool for a large number of computer vision applications, such as object recognition, object identification, and object tracking, where object classification is but one step.

In one application, the feature mask image 11 can be used to select 20 a set of object classifiers 21 from all available object classifiers 22. The selection process 20 uses the feature mask image 11, the positive training images 111, and a first set of negative training images 112. That is, the negative training images do not include the target object. Instead, those images are of scenes such as cityscapes, landscapes, seascapes, animals, non-face objects, and so forth.

The feature mask image 11 and a second larger set of negative training images 112 are used to construct 30 a linear cascade 31 of a subset of the selected classifiers 21. The feature mask image 11 and the cascade 31 can then be used to classify 40 an unknown image 41 as including an object 51, or not 52.

My invention is based on an idea that feature representation is a crucial part in any object classification system. This suggests that it is better to focus on features that correspond to coherent regions in the image. This leads to my idea of image segmentation. My method breaks the set of positive training images 112 into regions of pixels that have similar intensities. Given the image segments, my features are the mean and variance of the representative pixels 151 of each segment. Thus, the feature space is small. For example, if eight segments are used, then there are only sixteen features. Fewer numbers of segments are also possible.

Instead of basing the mean and variance of an image segment on all of the pixels in that segment, which would be time-consuming, I approximate the mean and variance of the entire segment using a small number of representative pixels, e.g., only four or less. With a very small feature space and a fast way to extract the features from a pixel image, it is now possible to perform an exhaustive search for all possible combinations of single, pairs or triplets of features to determine the best cascade of classifiers 31 for every stage of the classification process. Here, 'best' means in terms of performance and accuracy trade-offs.

Image Segments

FIG. 1B shows a method 100 for constructing the feature mask image 11. The set of positive training images 111 are acquired 110 out of the class of objects 101, e.g., human faces. The set can include thousands and thousands of training images. The set is 'positive' because every image includes a face. The positive training images 111 are cropped, sized, spatially aligned and otherwise normalized 115. The cropping removes hair and other irrelevant background material. The sizing and alignment makes all faces approximately the same size and orientation. Large-scale facial features, such the eyes, nose and chin can be used. The images can also be normalized with respect to pixel intensities and color. The normalized image 116 has just 20×20 pixels, while a typical training image can have millions of pixels. It should be understood that the normalized image could have other dimensions although it is advantageous if this number is small, e.g., about four hundred or less. It is assumed that all training images are acquired from substantially the same point of view, for example, the images are frontal for faces, since such images reveal the most distinguishing characteristics of faces.

A matrix A 121 is constructed 120 by stacking the normalized images in vector form using scan-line conversion. That, is the pixels are sequentially arranged in linear form.

Using principle component analysis (PCA), leading principal components are determined 130 by taking leading eigenvectors of a covariance matrix C determined as $$C = \frac{1}{N} A A^T,$$

where N is the number of positive training images in the set 111, and T is a vector transform of the matrix A. The leading principal components form a basis that approximates a space of all the columns of the matrix A, Sirovich et al., "Low-dimensional procedure for the characterization of human faces," Journal of the Optical Society of America 4, pp. 510-524, and Turk et al., "Eigenfaces for recognition," Journal of Cognitive Neuroscience, Vol. 3, No. 1, 1991.

Instead of examining the columns of the matrix A, as is done conventionally, I examine the rows. Each row in the matrix A expresses an intensity profile 131 at a particular pixel position in the set of training images 111. If two pixels are in the same region of the face, lets say the tip of the nose, or the center of a pupil, then the two pixels are likely to have substantially the same intensities, and hence, the two pixels have a strong 'intensity correlation'.

I determine these correlations and segment 140 the training images 111 into segments 141 of pixels that have a similar intensity correlation. I use factor analysis that seeks to find a low-dimensional representation that captures correlations between features, Duda et al., "Pattern Classification and Scene Analysis," Wiley-Interscience Publication, 1973, and Avidan, "EigenSegments: A spatio-temporal decomposition of an ensemble of image," European Conference on Computer Vision (ECCV), May 2002.

If $A^x$ is the $x^{th}$ row of the matrix A, then the row $A^x$ is the intensity profile of pixel x. I denote pixels with a single number because the images are represented in a scan-line vector form. For example, the first pixel in the 20×20 image 116 is number 1, and the last pixel is numbered 400. That is, the row $A^x$ is an N-dimensional vector, where N is the number of training images in the set 111, which has the intensities of pixel x in each image in the set.

Pixel x and pixel y are intensity correlated when a dot product of rows $A^x$ and row $A^y$ approaches one, and are uncorrelated when the dot-product approaches zero.

To locate correlated pixels, a clustering 140 process is applied to the rows of the matrix A. In particular, I use k-means clustering on the rows of the matrix A. K-means clustering is well known. However, any factor analysis 140 can be used for the segmentation. As a result, the training images are segmented 140 into several coherent segments 141 of correlated pixels. All of the training images 111 are represented by a single segmentation 141.

Locate Representative Pixels

My method 100 compares the mean and variance of the segments 141. However, instead of considering every pixel in the segment, I approximate every segment with a very small number of representative pixels 151 that approximate the mean and variance of the entire segment for the purpose of my method. That is, all of the training images 111 are represented by a small set of representative pixels 151 in the single feature mask image 11.

If $\mu_i(x_j)$ is a true mean of segment i of image j, then $\hat{\mu}(x_j)$ is the approximate of the mean, defined as $$\hat{\mu}_i(x_j) = \frac{\sum_{j=1}^{k} x_j}{k},$$

where $\{x_j\}_{j=1}^{k}$ are a subset of k pixels in the segment i of image j.

I use a greedy algorithm that searches 150 incrementally for the next representative pixel that minimizes $$\sum_{j=1}^{n} (\hat{\mu}_j(x_j)) - \mu_i(x_j))^2,$$

and add the pixel to a set of representative pixels 151 of segment i for each segment.

Given the representative pixels 151, the approximate variance $\hat{\sigma}_i(x_j)$ of segment i of image j is given by $$\hat{\sigma}_i(x_j) = \sum_{j=1}^{k} |x_j - \mu_i(x_j)|.$$

In practice, I use four or less representative pixels per segment. In step 160, I determine the features 161 as the approximate mean and variance of each representative pixel 151. The representative pixels 151, and the associated feature 161 become the feature mask image 11 during the actual object classification phase 40.

Figure 2:
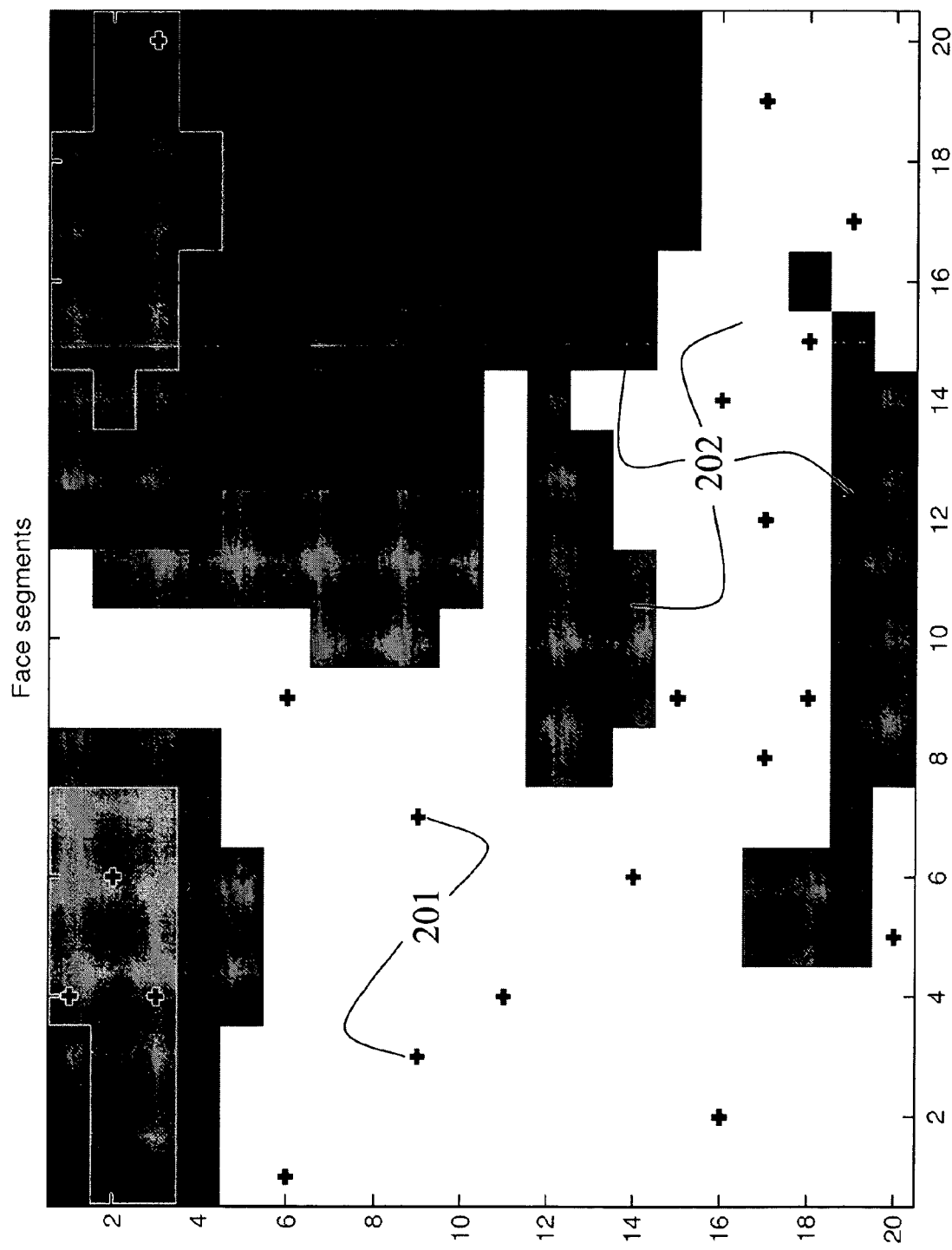
FIG. 2 is a block diagram of image segmentation according to the invention.

FIG. 2 shows an example segmentation using 1400 training images. Note that the segments need not be contiguous. The crosses 201 overlaid on the segments 202 mark the representative pixels 151.

Figure 3:
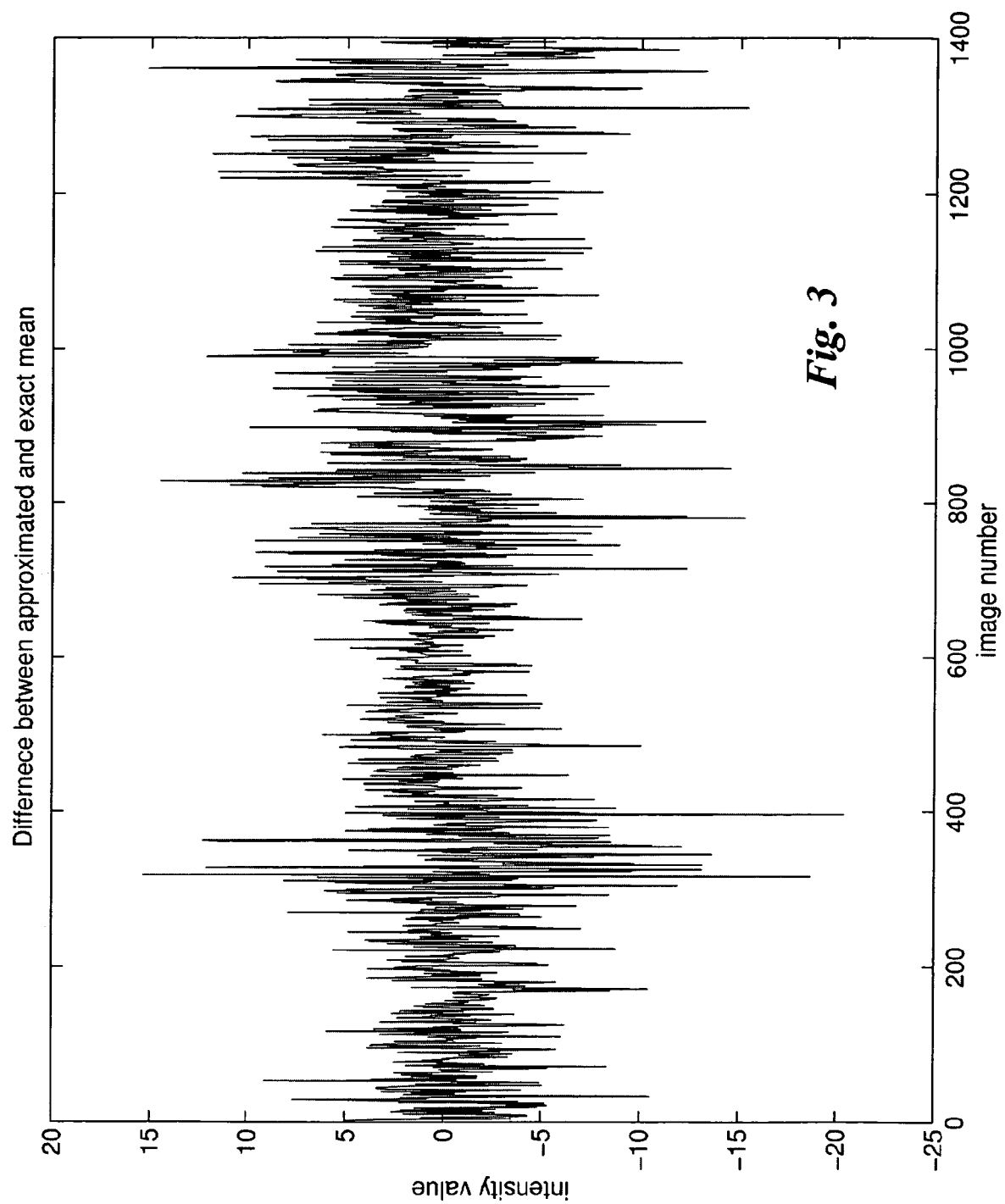
FIG. 3 is a graph of differences between actual and estimated means of image segments.

FIG. 3 shows differences between the approximate mean and the exact mean for 1400 images. The horizontal axis indicates the image number and the vertical axis the error in intensities. The difference rarely exceeds ten intensities.

Classification Cascade

For object classification in actual images, I use the constructed classifier cascade 31 that can quickly reject portions of images that do not include the target object.

My feature space is the approximate mean and variance 161 of the representative pixels 151. Typically, there are eight or fewer segments, each represented by its mean and variance, giving a total of sixteen features 161 or less. Because only four pixels or less are used for each segment, this feature space is very fast to determine. In addition, because the feature space is small, an exhaustive search can be performed for all available classifiers 22 on single, pairs and triplets of segments. Furthermore, this feature space yields enough information to classify texture-less regions without the need to normalize the mean or variance of the entire image.

Selecting Classifiers

I segment the set of positive training images 111 into several segments, and approximate every segment with the features 161 of the small number of representative pixels 151.

I perform an exhaustive search of the available classifiers 22 to select 20 a combination of classifiers 21 that reject a largest number of non-object images using the positive and the first set of negative training images. I repeat this process until an improvement in rejection is negligible.

Given the set of positive training images P 111, i.e., images with faces, and the set of negative training images N 112, i.e., images without faces, I select 20 the best classifiers and adjust five bounding parameters $\theta_b$ to classify d·P of the positive examples, e.g., d=0.95, and save r of the negative examples that are rejected correctly, as well as the five bounding parameters $\theta_b$. The process steps are as follows.

For each segment i, locate a first bound on the corresponding approximate mean. Formally, find $\theta_1$, such that $\hat{\mu}_i(x) > \theta$ or $\hat{\mu}_i(x) < \theta$.

For each segment i, locate a second bound on the corresponding approximate variance. Formally, find $\theta_2$ such that $\hat{\sigma}_i(x) > \theta$ or $\hat{\sigma}_i(x) < \theta$.

For each pair of segments i,j, locate a third bound on a difference between the approximate means. Formally, find $\theta_3$ such that $\hat{\mu}_i(x) - \hat{\mu}_j(x) > \theta$ or $\hat{\mu}_i(x) - \hat{\mu}_j(x) < \theta$.

For each pair of segments i,j, locate a fourth bound on the difference between their approximate variance. Formally, find $\theta_4$ such that $\hat{\sigma}_i(x) - \hat{\sigma}_j(x) > \theta$ or $\hat{\sigma}_i(x) - \hat{\sigma}_j(x) < \theta$.

For each triplet of segments i,j, k find a fifth bound on the difference of the absolute difference of their approximate means. Formally, find $\theta_5$ such that $|\hat{\mu}_i(x) - \hat{\mu}_j(x)| - |\hat{\mu}_i(x) - \hat{\mu}_k(x)| > \theta$.

This process is performed one time to select the set of classifiers 21. I do not retrain after selecting a particular classifier.

Constructing a Cascade

Next, I need to organize a subset of the selected classifiers 21 linearly into the cascade 31. I construct the cascade of classifiers by considering a very large second set of negative training images. These are images that do not include the target object. These images are also cropped, aligned, and otherwise normalized to match the positive set of training images.

As shown in FIG. 4A, I construct a binary rejection table T 400. Each column i represents all of the negative training images, and each row j represents a classifier.

An entry T(i,j)=1 (401) if a classifier i rejects an image j, and 0 (402) if the image is accepted. Because the table T is binary, I can store every entry in a single bit and therefore a table of 513,000 negative images of the second set and the 664 selected classifiers can easily fit in memory. I use a greedy algorithm to select a first classifier (a) of the cascade 31, see FIG. 1A, with a highest rejection score r by computing the sum r 410 for each column.

Then, as shown in FIG. 4B, for each entry T(i,j)=1 in a highest score column, I delete the corresponding row j, and compute the next highest sum 411 to select the next classifier (b) for the cascade 31, until the necessary number of classifiers have been selected according to some predetermined threshold.

Figure 5:
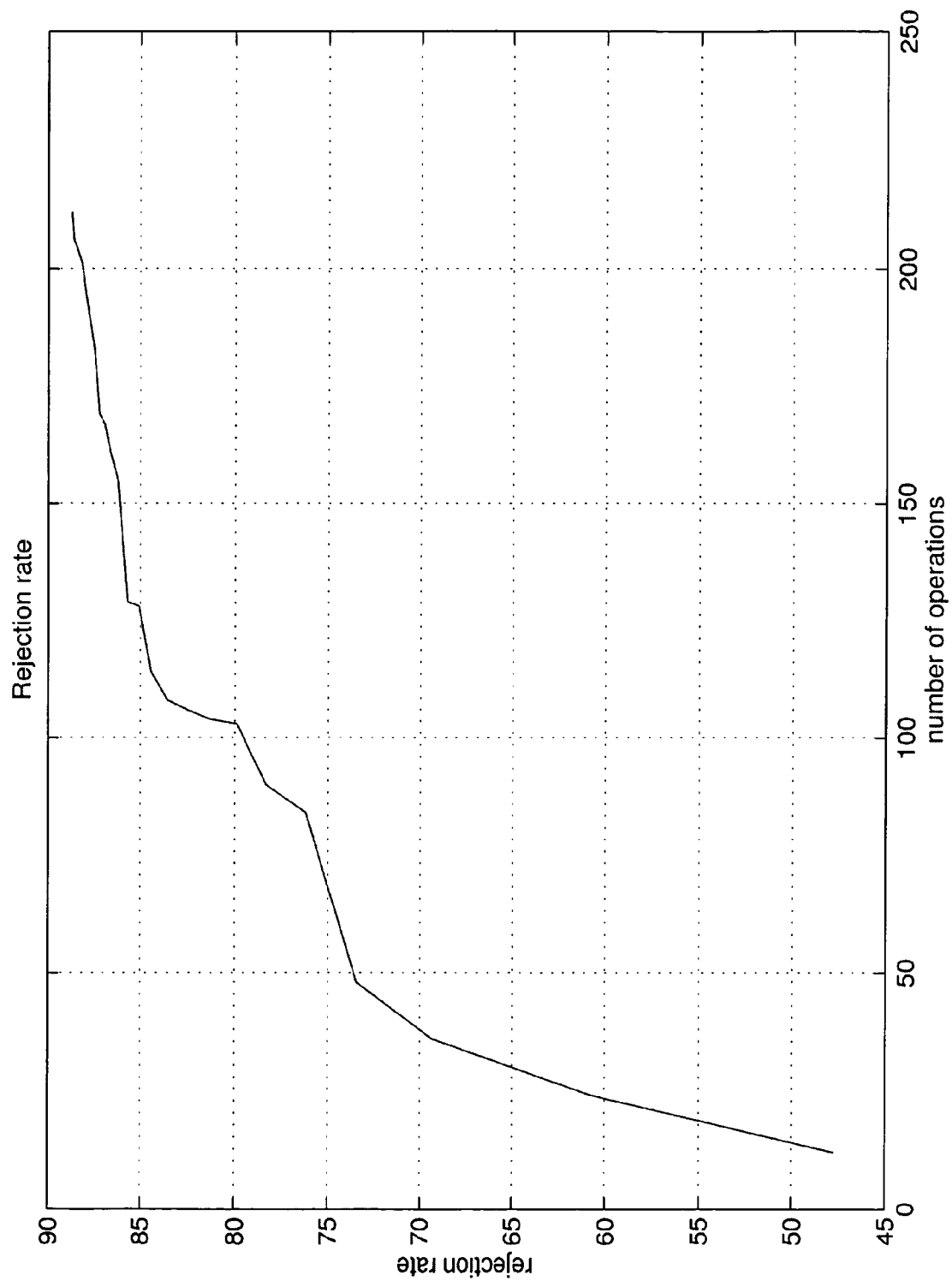
FIG. 5 is a graph of a rejection rate according to the method of the invention.

FIG. 5 shows the rejection rate of this cascade on a training set of 513,000 negative images, as well as the number of required operations. Note that about 50% of all images are rejected by the first classifier using only twelve operations.

Texture-Less Region Classification

The above demonstrates that a cascade of classifiers performs less than optimally for segments with a small amount of texture due to the lack of variance normalization. However, if the approximate mean and variance are known for all of the image segments, I can also construct classifiers for textureless segments. In particular, I construct the following two classifiers.

Reject all image segments where the variance of all eight approximate means falls below a predetermined threshold. Formally, find $\theta_M$ such that $$\hat{\sigma}(\hat{\mu}_i(x)) < \theta \ i=1 \ldots 8,$$

and reject all images, where the variance of all eight approximate variances falls below a threshold. Formally, find $\theta_v$ such that $$\hat{\sigma}(\hat{\sigma}_i(x)) < \theta \ i=1 \ldots 8.$$

Linear Classifiers

Finally, I construct a cascade of, e.g., ten, linear classifiers, using all sixteen features, i.e., the approximate means and variance of eight or fewer segments.

Image Pyramids

My cascade of classifiers 31 operates on a multi-resolution pyramid of the unknown image 41. This is a reasonable assumption because many conventional systems build image pyramids for additional applications such as tracking. However, I can extend my method to work without pyramids as follows.

My method works with a small number of representative pixels. Therefore, I can scale the coordinates of the representative pixels 151 to a rectangle of any size, as needed, instead of scaling down the image.

During the classification, it assumed that the unknown image 41 could include one or more target objects anywhere in the image. Therefore, the image is partitioned into a plurality of overlapping rectangles or 'patches' of various sizes, and the cascade 31 is applied to each patch in turn. Typically, the overlapping patches are scanned in a raster scan order for each of the various sized patches.

Because object classifiers are insensitive to small changes in pose and scale, I adopt a heuristic that only four overlapping detections classify an object. This reduces the number of detected patches around the face, as well as rejecting some spurious false detections.

Effect of the Invention

The invention classifies objects in images that have been segmented according to similarity of pixel intensities. A mean and variances is determined for each segment based on a small number of representative pixels. A relationships between the mean and variance of the image segments is used to form a cascade of a small number of classifiers that can reject nearly 99.9% of the image portions, thus only a small fraction of the total number of image portions are passed to a full-scale classifier.

Because the number of segments is very small, it is possible to exhaustively search all possible classifiers based on single, pairs and triplets of segments in order to find the best classifiers in every step of the cascade. This is in contrast to prior art methods that construct a huge feature bank and use a 'greedy' feature selection algorithm to select 'good' features. The method can accelerate conventional machine learning algorithms that are too slow for object classification.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for representing a class of objects, comprising:
    constructing a matrix A from a set of positive training images, in which each row in the matrix A corresponds to a vector of intensities of pixels at a particular pixel position in each one of the positive training images;
    generating a segmented feature mask image, in which each segment of the segmented feature mask image corresponds to pixels with correlated intensities determined according to the vectors of intensities;
    selecting, from each segment, a subset of representative pixels, in which a number of pixels in the subset is four or less; and
    approximating each segment with a set of features, in which the set of features for the segment is determined from the corresponding subset of the representative pixels of each segment of the feature mask image to represent the class of objects.

2. The method of claim 1, in which the set of features of each segment includes an approximate mean of the intensities and an approximate variance of the intensities of the segment.

3. The method of claim 1, further comprising:
    normalizing the set of positive training images before the constructing.

4. The method of claim 3, in which each normalized image has about four hundred or fewer pixels.

5. The method of claim 1, in which the columns in the matrix A correspond to leading components of a covariance matrix $$C = \frac{1}{N} A A^T,$$

where N is the number of positive training images in the set, and T is a vector transform of the matrix A.

6. The method of claim 1, in which the generating performs factor analysis.

7. The method of claim 6, in which the factor analysis is K-means clustering.

8. The method of claim 2 in which $\mu_i(x_j)$ is a true mean of the intensities of the set of pixels x in segment i of image j, and further comprising:
    approximating the mean $\hat{\mu}(x_j)$ according to $$\hat{\mu}_i(x_j) = \frac{\sum_{j=1}^{k} x_j}{k},$$

where $\{x_j\}_{j=1}^{k}$ is the subset of k representative pixels in the segment i of the image j.

9. The method of claim 8, in which the selecting performs a greedy incremental search that minimizes $$\sum_{j=1}^{n} (\hat{\mu}_j(x_j)) - \mu_i(x_j))^2,$$

for a next pixel of the set of pixels of the segment i to add to the subset of representative pixels.

10. The method of claim 9, in which the approximate variance $\hat{\sigma}_i(x_j)$ of segment i of image j is $$\hat{\sigma}_i(x_j) = \sum_{j=1}^{k} |x_j - \mu_i(x_j)|.$$

11. The method of claim 1, in which a total number of features of the segmented feature mask image is sixteen or less.

12. The method of claim 1, in which a total number of segments is eight or less.

13. The method of claim 1, further comprising:
searching exhaustively, for a set of selected classifiers, from a set of all available classifiers for the class of objects on single, pairs and triplets of the segments for a combination of segments and each available classifier that reject a largest number of non-object images using the positive training images and a set of negative training images.

14. The method of claim 13, further comprising:
organizing the set of selected classifiers in a linear cascade.

15. The method of claim 14, further comprising:
constructing a binary rejection table T, in which each column i represents a second set of negative training images, and each row j represents one of the selected classifier, and an entry T(i,j)=1 if a particular classifier i rejects a particular image j, and 0 if the particular image i is accepted.

* * * * *